United States Patent [19]

Wood et al.

[11] Patent Number: 4,675,889
[45] Date of Patent: Jun. 23, 1987

[54] MULTIPLE WAVELENGTH X-RAY DISPERSIVE DEVICES AND METHOD OF MAKING THE DEVICES

[75] Inventors: James L. Wood, Westland; Nicola J. Grupido, Union Lake; Keith L. Hart, Flat Rock; John E. Keem, Bloomfield Hills, all of Mich.

[73] Assignee: Ovonic Synthetic Materials Company, Inc., Troy, Mich.

[21] Appl. No.: 752,929

[22] Filed: Jul. 8, 1985

[51] Int. Cl.⁴ .............................................. G21K 1/06
[52] U.S. Cl. ........................................ 378/84; 378/85
[58] Field of Search ...................... 378/84, 85; 350/164

[56] References Cited

U.S. PATENT DOCUMENTS 3,397,312  8/1968  Okano .................................. 378/85

OTHER PUBLICATIONS

Underwood and Barbee, Jr., "Layered Synthetic Microstructures as Bragg Diffractors", *Applied Optics*, vol. 20, No. 17, Sep. 1981, pp. 3027–3034.

Underwood and Attwood, "The Renaissance of X-Ray Optics", *Physics Today*, Apr. 1984, pp. 44–52.

*Primary Examiner*—Craig E. Church
*Assistant Examiner*—David P. Porta
*Attorney, Agent, or Firm*—John T. Winburn; Marvin S. Siskind; Richard M. Goldman

[57] ABSTRACT

Multiple wavelength X-ray dispersive devices and method of forming them are provided which reflect at least two wavelengths of interest at the same or different angles. The devices include a plurality of layer sets formed on one another, each set having at least two units. At least one unit includes at least two layers having a first d spacing and the second unit has at least one layer with a second d spacing. A plurality of one or both of the units can also be provided in each layer set.

16 Claims, 21 Drawing Figures

MULTIPLE WAVELENGTH X-RAY DISPERSIVE DEVICES AND METHOD OF MAKING THE DEVICES

BACKGROUND OF THE INVENTION

This invention relates to multiple wavelength X-ray dispersive devices. The devices utilize synthetic layered structures which are free from the constraints of crystalline symmetries. The layered structures are chosen to reflect two or more wavelengths of interest at the same or different angles.

Commercial X-ray dispersive structures are formed from crystalline structures such as LiF, metal acid phthalates (map), pyrolytic graphite and Langmuir-Blodgett (LB) films. These materials have very restrictive lattice spacing constraints. In addition, the LB and map devices have severe environmental limitations and must be operated near room temperature in a dry environment. LB devices are not appropriate for very high vacuum applications since under certain conditions they can evolve contaminants. They are also inappropriate for high incident beam energy applications since they can decompose. They have poor mechanical integrity, such as scratch resistance, mechanical breaking strength and resistance to abrasion. Further, all of the prior structures have lower reflectivities than desired.

Numerous attempts to construct both natural and new crystalline analogue materials have been made with the aim of extending the X-ray properties heretofore limited by the availability of natural crystalline materials. One such attempt is compositional modulation by molecular beam epitaxy (MBE) deposition on single crystal substrates. For example, in Dingle et al., U.S. Pat. No. 4,261,771, the fabrication of monolayer semiconductors by one MBE technique is described. These modulated prior art structures are typically called "superlattices." Superlattices are developed on the concept of layers of materials forming homo-or hetero-epitaxially grown planes or film layers resulting in a one-dimensional periodic potential. Typically, the largest period in these superlattices is on the order of a few hundred Angstroms; however, monatomic layered structures have also been constructed.

The superlattices can be characterized by the format of a number of layer pairs formed by a layer of A (such as GaAs) followed by a layer of B (such as AlAs), etc.; formed on a single crystal substrate. The desired superlattice is a single crystal synthetic material with good crystalline quality and long range order. The thickness of each layer pair (A and B) is defined as the "d" spacing. These structures are not appropriate for most reflective or dispersive structures due to the small electron density contrast between the layers. These structures being essentially single crystals with extra super lattice periodicities also suffer from restrictive d spacing, associated with the constraint that the entire structure be a single crystal.

In addition to the MBE type of superlattice construction techniques, other researchers have developed layered synthetic microstructures (lsm) utilizing other forms of vapor deposition, including diode and magnetron sputtering, reactive gas injection and standard multisource evaporation. The layer dimensions are controlled by shutters or moving the substrates relative to the material sources or with combinations of shutters and relative motion. In the case of multisource evaporation, the required thickness control is achieved by monitoring the X-ray reflectivity of the film in situ as the deposition is being made. The materials reported have been formed from crystalline layers, noncrystalline layers and mixtures thereof; however, generally the efforts so far reported are directed at the synthesis of superlattice-type structures by precisely reproducing the deposition conditions on a periodic reoccurring basis. Some of the structures have graded d spacing across or through the structures.

These materials can be thought of as synthetic crystals or crystal analogues in which it is defined as crucial that the long range periodicity or repetition of a particular combination of layers be maintained. These structures are both structurally and chemically homogeneous in the x-y plane, and are periodic in the third (z) direction. These construction approaches particularly sputtering, can utilize a greater variety of materials than evaporation. The d spacing in a structure can be graded throughout the structure to provide some reflectivity for a range of X-ray wavelengths, but the prior art does not achieve optimum control of higher order reflections and the deposition precision is not as good as desired. This results in interfaces and layer thicknesses which are not as precise as desired for certain applications. One desired goal in producing high efficiency X-ray reflectors is to produce a maximum contrast in electron density across the most precisely defined interface which produces the greatest number of orders of reflection. Further, the smoothness of the layer surfaces must be as precise as possible to minimize scattering caused by the surface variations.

These prior art X-ray reflectors or dispersive structures are designed to reflect a single wavelength at a single angle. The prior reflectors are designed to inhibit other wavelengths and are limited in the range of wavelengths which can be reflected.

X-ray dispersive structures and methods of making them are described in copending applications, "Improved X-ray Dispersive And Reflective Structures And Method Of Making The Structures", filed June 6, 1983, U.S. Ser. No. 501,659, John E. Keem et al. and "Improved Reflectivity And Resolution X-Ray Dispersive And Reflective Structures And Method Of Making The Structures", filed Oct. 31, 1983, U.S. Ser. No. 547,338, which are incorporated by reference herein. The layered structures described therein and the methods of making them are particularly applicable to making the multiple wavelength dispersive devices of the present invention.

SUMMARY OF THE INVENTION

The disadvantages of the prior art are overcome by X-ray dispersive structures which reflect two or more wavelengths of interest at the same or different angles. A plurality of layer sets are selected and formed on one another to reflect the desired wavelengths. Each layer set includes at least a first and a second unit. One of the units includes at least two layers which cause the layer sets to have X-ray dispersive properties at a first wavelength and the second unit includes at least one layer which causes the layer sets to have X-ray dispersive properties at a second wavelength.

The layer sets can include more than one of the first or second units. The units can be formed of layers of the same or different materials.

DESCRIPTION OF THE PREFERRED EMBODIMENTS

Figure 1:
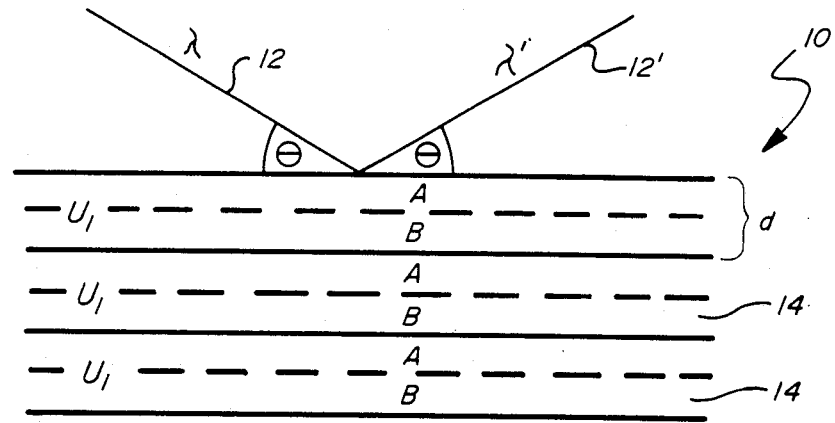
FIG. 1 is an exploded partial sectional view of a prior art X-ray dispersive structure illustrating the X-ray dispersive pattern.

FIG. 1 shows the dispersion pattern of a typical prior art layered structure 10. While only three layer pairs have been shown, having a layer spacing d, typically many layer pairs are utilized for example on the order of 100-2000. An incident beam 12 is made up of a band of wavelengths, $\lambda$ being an example of one wavelength. The reflected beam 12' is made up of a substantially single wavelength $\lambda'$ reflected at angle $\theta$, approximately according to Bragg's law $n\lambda' = 2d \sin \theta$. This condition is also satisfied for all subharmonics of $\lambda'$, i.e. $\lambda'/2$, $\lambda'/3$ ... $\lambda'/n$. Therefore, the reflected beam 12' contains all of these wavelengths in proportion to both their intensity in the incident beam and the magnitude of the higher orders of reflection which result from the substantially rectangular electron density distribution. $I_i(\lambda)$ is the incident intensity distribution of $\lambda$ and $I_r(\lambda')$ is the reflected intensity distribution of $\lambda'$. (A full theoretical treatment results in a modification of Bragg's law resulting from refraction of the X-ray beam.)

Each layer pair contributes to the reflected beam intensity at a like angle. The reflection from only one layer pair is illustrated. The structure 10 generally is curved to focus the reflected wavelength of interest from each layer pair onto a detector. The structure 10 is formed from a plurality of layer pairs 14, each layer pair 14 includes a pair of different material layers A and B which is intended to have an abrupt junction between each layer. Functionally, this means there essentially is a square wave density or refraction index which intercepts the beam 12. The structure 10 can be thought of as a plurality of sets of the layer pairs 14. Each of the pairs of layers 14 can be thought of as a unit $U_1$ for comparison with the description of the invention.

The structures 10 are designed to reflect a single wavelength 12' and inhibit other wavelengths in accordance with Bragg's law, $\lambda = 2d \sin \theta$. Since $\theta$ always is less than one, then $\lambda$ must always be less than or equal to 2d. Therefore, the possible range of wavelengths which can be reflected from the structure 10 is always limited by the d spacing for the wavelength chosen.

Figure 2:
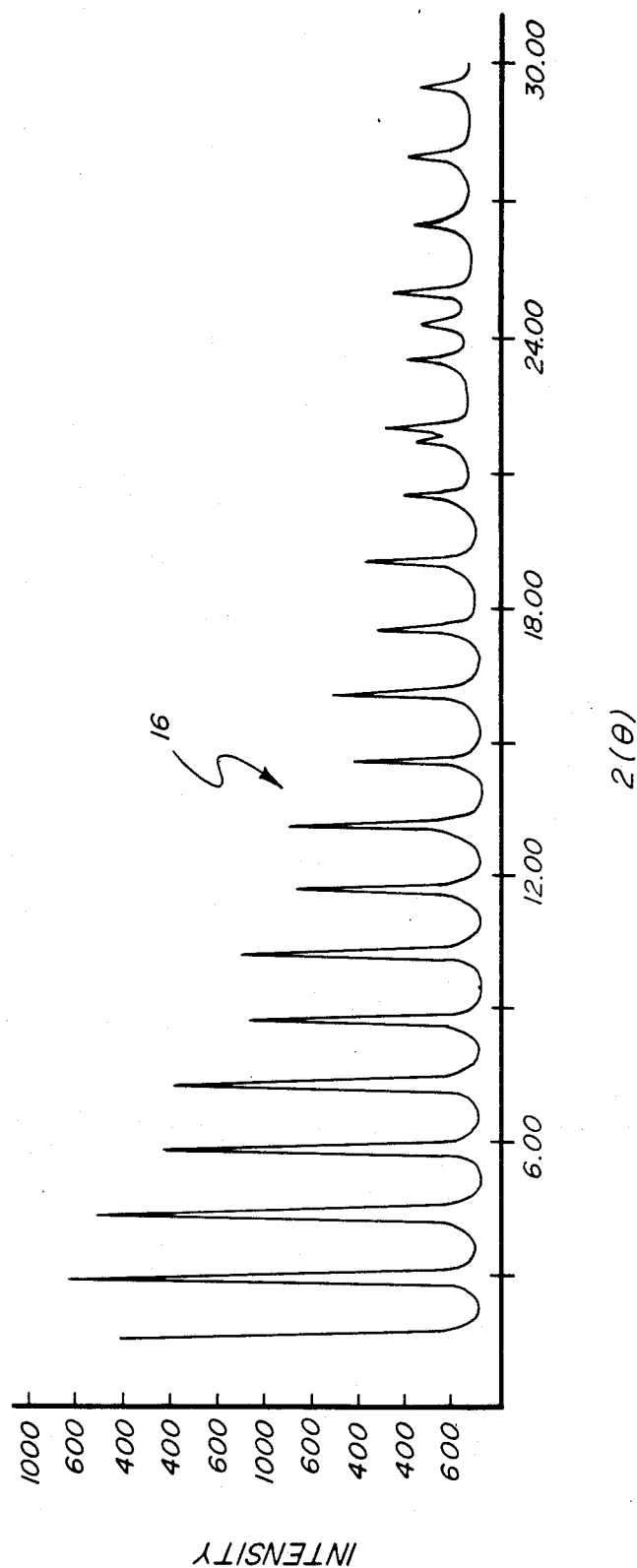
FIG. 2 is a diffraction pattern generated by the prior art structure of FIG. 1.

FIG. 2 illustrates a diffraction pattern 16 caused by the incident beam 12 impinging on a prior art LB X-ray dispersive structure. Each of the peaks is an order of reflection, n, for the wavelength $\lambda'$ (the wavelength of interest) as derived according to the approximate relationship $n\lambda' = 2d \sin \theta_n$. The prior art lsm devices exhibit similar diffraction patterns, which essentially are controlled by the materials deposited and the d spacings utilized in the devices.

Figure 3:
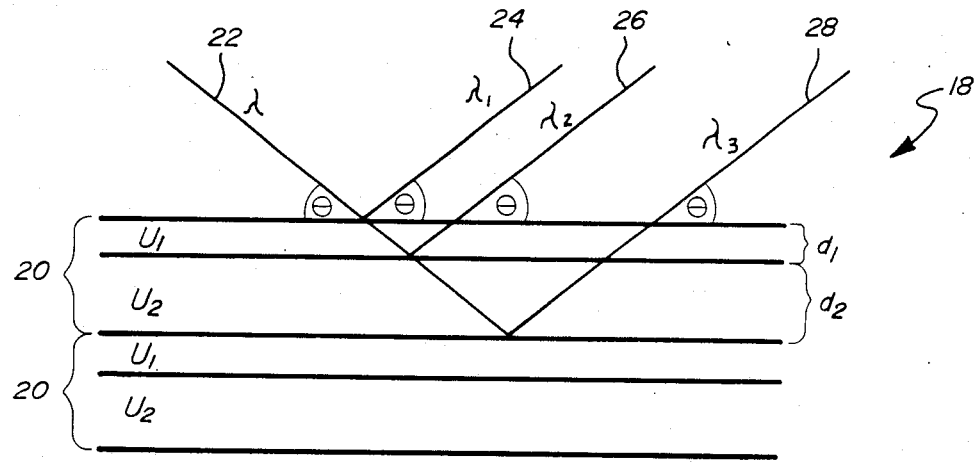
FIG. 3 is an exploded partial sectional view of one embodiment of the X-ray dispersive device of the invention illustrating the X-ray dispersive pattern.

A first embodiment 18 of the X-ray dispersive device of the invention is best illustrated in FIG. 3. The device 18 is constructed of a plurality of layer sets 20, only two of which are illustrated, but which typically would be at least 20-100 sets. Each of the layer sets 20 is formed from at least two units, $U_1$ and $U_2$. The units $U_1$ and $U_2$ have respective d spacings of $d_1$ and $d_2$, which are not equal to one another. The layer sets 20 can be designed to reflect two or more wavelengths of interest at the same or different angles.

One of the units $U_1$ and $U_2$, includes at least one layer of material which has X-ray dispersive properties substantially at least at a first wavelength of interest. For example, $U_1$ can include at least two layers with a d spacing of $d_1$. An incident X-ray beam 22 will have a ray 24 at a wavelength $\lambda_1$ reflected from the device 18 according to $\lambda_1 = 2d_1 \sin \theta$. The second unit $U_2$ can include at least two layers with a d spacing of $d_2$ which will cause a ray 26 at a wavelength $\lambda_2$ to be reflected from the device 18 according to $\lambda_2 = 2d_2 \sin \theta$. A third ray 28 at a wavelength $\lambda_3$ will be reflected from the device 18 according to $\lambda_3 = 2(d_1 + d_2) \sin \theta$.

A variety of the devices have been constructed to prove the operation of the devices of the invention. Further, a large number of the devices have been modeled from a model system, which is an exact solution to Maxwell's equations with the approximation that each of the layers in the device is a homogeneous optical media in the X-Y plane. The model results have been compared with experimental data and have proven to be substantially in conformance with the experimental data for the first several orders of reflection. The complex refractive index $\hat{n}$ for a material layer is:

$$\hat{n} = 1 - \delta - i\beta$$

where the real part of the index $$\delta = 2.72 \times 10^{-6} (\rho/M) \lambda^2 f_1$$

the imaginary part of the index $$\beta = 2.72 \times 10^{-6} (\rho/M) \lambda^2 f_2$$

and $\lambda$ is the wavelength, M is the atomic weight, $\rho$ is the density of the material and $f_1$ and $f_2$ are the atomic scattering factors. The scattering factors $f_1$ and $f_2$ can be measured or can be taken from tables such as those calculated by B. L. Henke, et al., *Atomic Data and Nuclear Data Tables,* Vol. 27, No. 1, pp. 1-144, 1982.

In designing the devices of the invention, such as the device 18 each of the units $U_1$ and $U_2$ are designed for performance at a particular wavelength of interest. The result is a device which produces an approximately equal performance for each of the wavelengths of interest. Unit $U_1$ will be chosen from a material or materials formed in a layer or layers with a d spacing $d_1$ to produce a maximum performance for $\lambda_1$ with a minimum absorption of $\lambda_2$. This corresponds to a maximum reflectivity for $\lambda_1$ and a minimum $\beta$ for $\lambda_2$. The second unit then will be chosen from the same or different materials formed in at least two layers with a d spacing of $d_2$ to produce a maximum performance $\lambda_2$ with a minimum absorption of $\lambda_1$. Again, this corresponds to a maximum reflectivity for $\lambda_2$ and a minimum $\beta$ for $\lambda_1$. In the case of the same materials being chosen for both units $U_1$ and $U_2$, the wavelengths which can be reasonably reflected are greatly restricted since $\delta$ and $\beta$ will be the same for each unit. Utilizing different materials allows much greater flexibility in designing the devices.

The materials selected for a wavelength of interest can be determined in accordance with the following procedure; which is directed, for example, to wavelength at B K $\alpha$ (67.6Å), Be K $\alpha$ (114Å) and Li K $\alpha$ (228Å). The procedure is based upon the tabulated values of the atomic scattering factors $f_1$ and $f_2$ such as those calculated by Henke. It is quite possible that as further measurements and/or improved calculations for these factors become available, then the choice of materials may change, but the procedure will remain the same.

According to the procedure, a first material is chosen, which can be designated the light material, which has the minimum $\delta$ selected by determining the minimum product for $f_1$ $(\rho/M)$ and the minimum $\beta$ selected by determining the minimum product for $f_2$ $(\rho/M)$. A second material is then chosen, which can be designated the heavy material, which again has the minimum $\beta$ selected by determining the minimum product for $f_2$ $(\rho/M)$, but has a maximum $\delta$ selected by determining the maximum product for $f_1$ $(\rho/m)$.

This provides the largest difference between $\delta_1$ and $\delta_2$. These resulting product values are then utilized to calculate the performance for the selected materials in the multilayer device with a fixed ratio of the light element, material, compound or alloy to the heavy element, material, compound or alloy. The performance also can be calculated for different ratios between the heavy and light materials to determine the best ratio between the two materials. The atomic density $(\rho/M)$ is given by element and the products for alloys or compounds are determined by the relative percentage of the elements in the compounds or alloys. The materials generally can be selected from the following elements: lithium, beryllium, boron, carbon, magnesium, aluminum, silicon, scandium, titanium, vanadium, chromium, manganese, iron, cobalt, nickel, copper, germanium, yttrium, zirconium, niobium, molybdenum, ruthenium, rhodium, palladium, silver, tin, hafnium, tantalum, tungsten, rhenium, iridium, platinum, gold and bisbuth. Additionally, such compound materials as oxides or nitrides, fluorides, chlorides and halides also can be utilized, such as $SiO_2$ or $Si_3N_4$.

If the product values are not significantly different between some of the selected materials, then the material choices all should be calculated utilizing the model calculation and the same composition ratio to make an appropriate comparison of the performance of the different materials at the wavelengths of interest.

Utilizing the referenced tables, silicon provides an $f_2$ $(\rho/M)$ of 0.04 and an $f_1$ $(\rho/M)$ of $-0.24$ for Be K $\alpha$, which is an optimum choice after considering the rest of the potential light elements. For the heavy elements, molybdenum provides an $f_2$ $(\rho/M)=0.33$ and an $f_1$ $(\rho/M)=1.98$ which is an optimum choice. These values have been utilized in the model calculations along with some other possible material choices at the best material ratios and the results are tabulated in Table I for Be K $\alpha$, B K $\alpha$ and Li K $\alpha$ radiation.

| Material | Percent Reflectivity | | |
|---|---|---|---|
| | B K $\alpha$ | Be K $\alpha$ | Li K $\alpha$ |
| $Mo_{25}Si_{75}$ | 7 | 17 | 45 |
| $Mo_{25}C_{75}$ | 25 | 24 | 16 |
| $W_{25}Si_{75}$ | 9 | 9 | 26 |
| $W_{25}C_{75}$ | 16 | 10 | 9 |

Clearly, $Mo_{25}Si_{75}$ is superior for Li K $\alpha$ and $Mo_{25}C_{75}$ is superior for both Be and B K $\alpha$.

In these multiple d spacing devices, a given wavelength of interest will have associated with it at least a first order reflected response for each periodicity (d spacing) which satisfies Bragg's law. Depending upon the design of the layer sets, each of the first order reflections can be associated with one or more higher orders of reflection. Also, although the plotting scales were chosen to exhibit the full potential dynamic range of the devices of the invention, generally the detection equipment will be adjusted for the sensitivity level which will reject the lower intensity reflections which are not of interest. Therefore, a proper selection of the detected angle and sensitivity level will provide the selectivity desired. In general, the diffraction patterns for the different wavelengths of interest for the device examples have been plotted on separate graphs for clarity of understanding. In an actual device, the responses will correspond to the separate diffraction patterns added together.

Figure 4A:
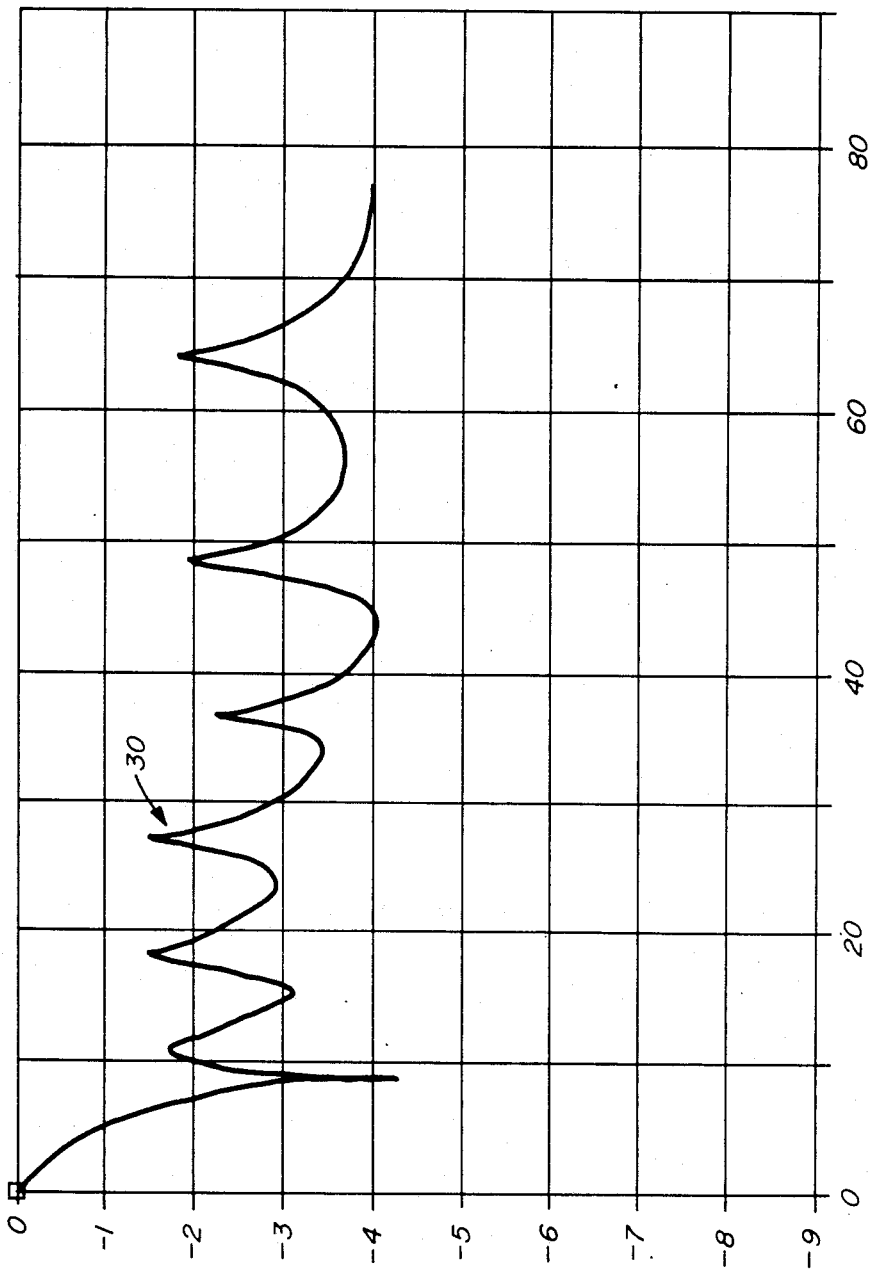
FIGS. 4A and 4B are models of a diffraction pattern generated by one example of the device of FIG. 3.
Figure 4B:
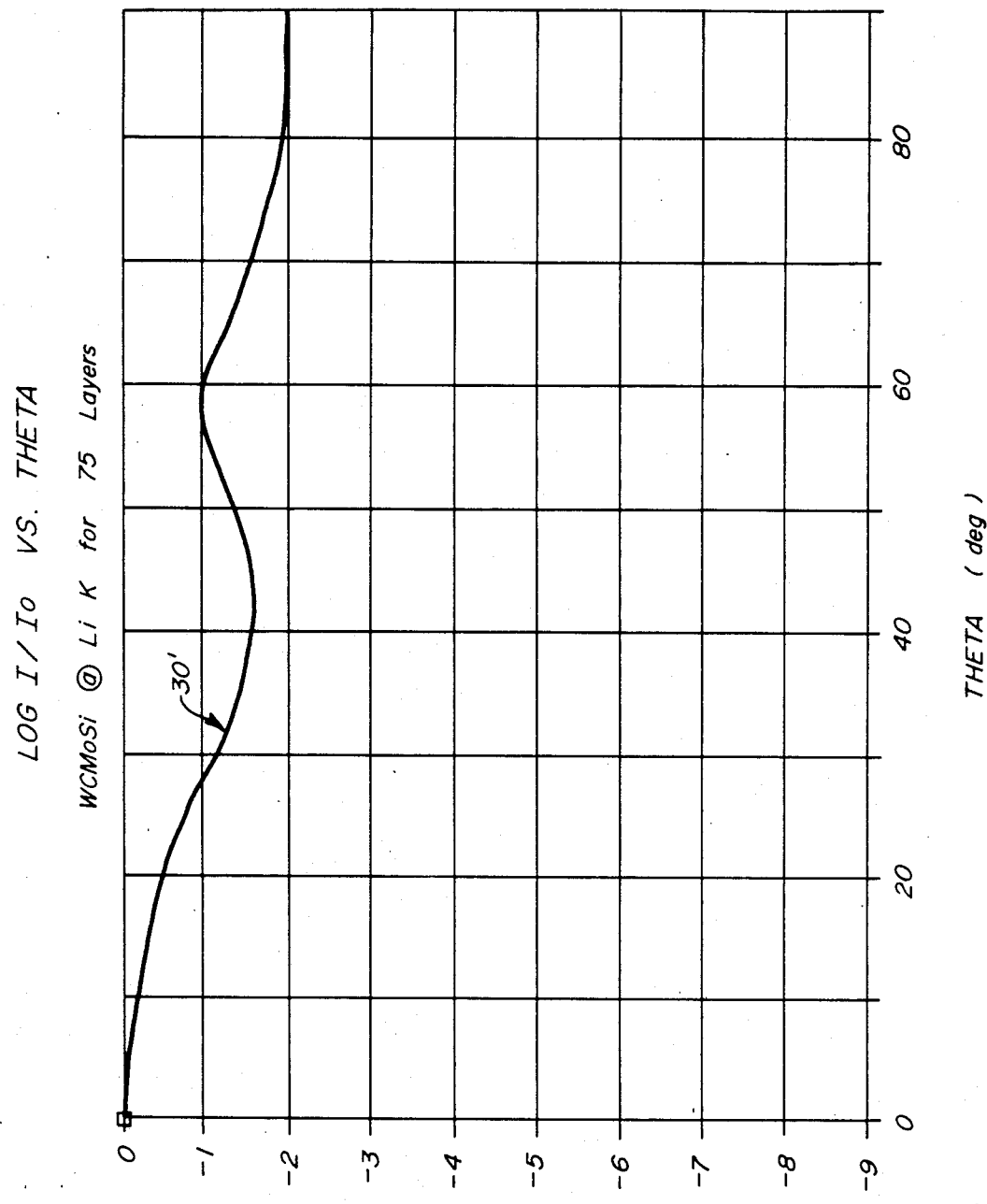

FIGS. 4A and 4B illustrate a modeled diffraction pattern 30 and 30' caused by the beam 22 impinging on one example of the device 18. Unit $U_1$ has a d spacing $d_1$ of 50Å formed by a 10Å thick layer of tungsten (layer A) and a 40Å thick layer of carbon (layer B). (The same order of layers A and B will be utilized in describing each of the unit structures.) Unit $U_2$ has a d spacing $d_2$ of 100Å formed by a 20Å thick layer of molybdenum and an 80Å thick layer of silicon. The layer set 20 has a d spacing $(d_1+d_2)$ of 150Å. This structure extends the wavelength range of the device 18 over the prior art device 10 and also allows a range of angles to be selected to detect some wavelengths.

This device was modeled for C K $\alpha$ and Li K $\alpha$ radiation. FIG. 4A illustrates the diffraction pattern 30 for the C K $\alpha$ radiation. The first three peaks correspond to the first order peak reflections corresponding to $d_1$ approximately at an angle $\theta$ of 11 degrees, $d_2$ approximately at an angle of 18 degrees and $d_1+d_2$ at an angle of approximately 27 degrees. The subsequent peaks correspond to higher order reflections. The reflected wavelength of carbon to be utilized can be chosen as appropriate, by the highest intensity or the best angular position or by a combination of the two factors. FIG.

4B illustrates the diffraction pattern 30' for the Li K α radiation. Here only a single reflectivity peak corresponding to $d_1+d_2$ at an angle of approximately 59 degrees satisfies Bragg's law.

One of the units $U_1$ or $U_2$ also can include only one layer which will cause one wavelength not to be reflected. For example, $U_1$ can include one layer with a d spacing of $d_1$. The single layer will not cause a wavelength $\lambda_1$ to be reflected. Only the wavelengths $\lambda_2$ and $\lambda_3$ will be reflected according to the equations set forth above. Such devices can be utilized in fixed angle spectrometers to provide multiple reflected wavelengths of interest, at least some at different angles, with a single device and without changing the device.

Figure 5A:
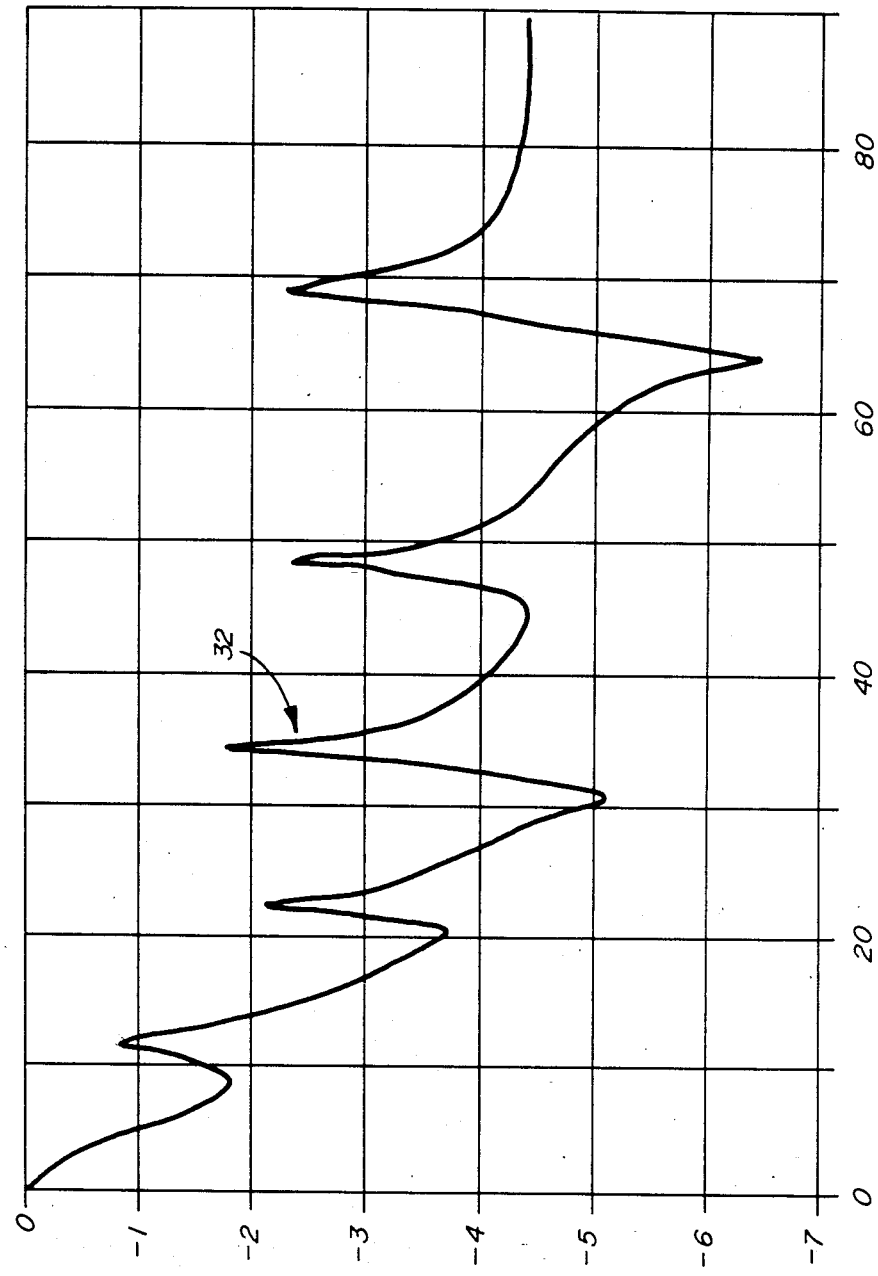
FIGS. 5A and 5B are models of a diffraction pattern generated by a second example of the device of FIG. 3.
Figure 5B:
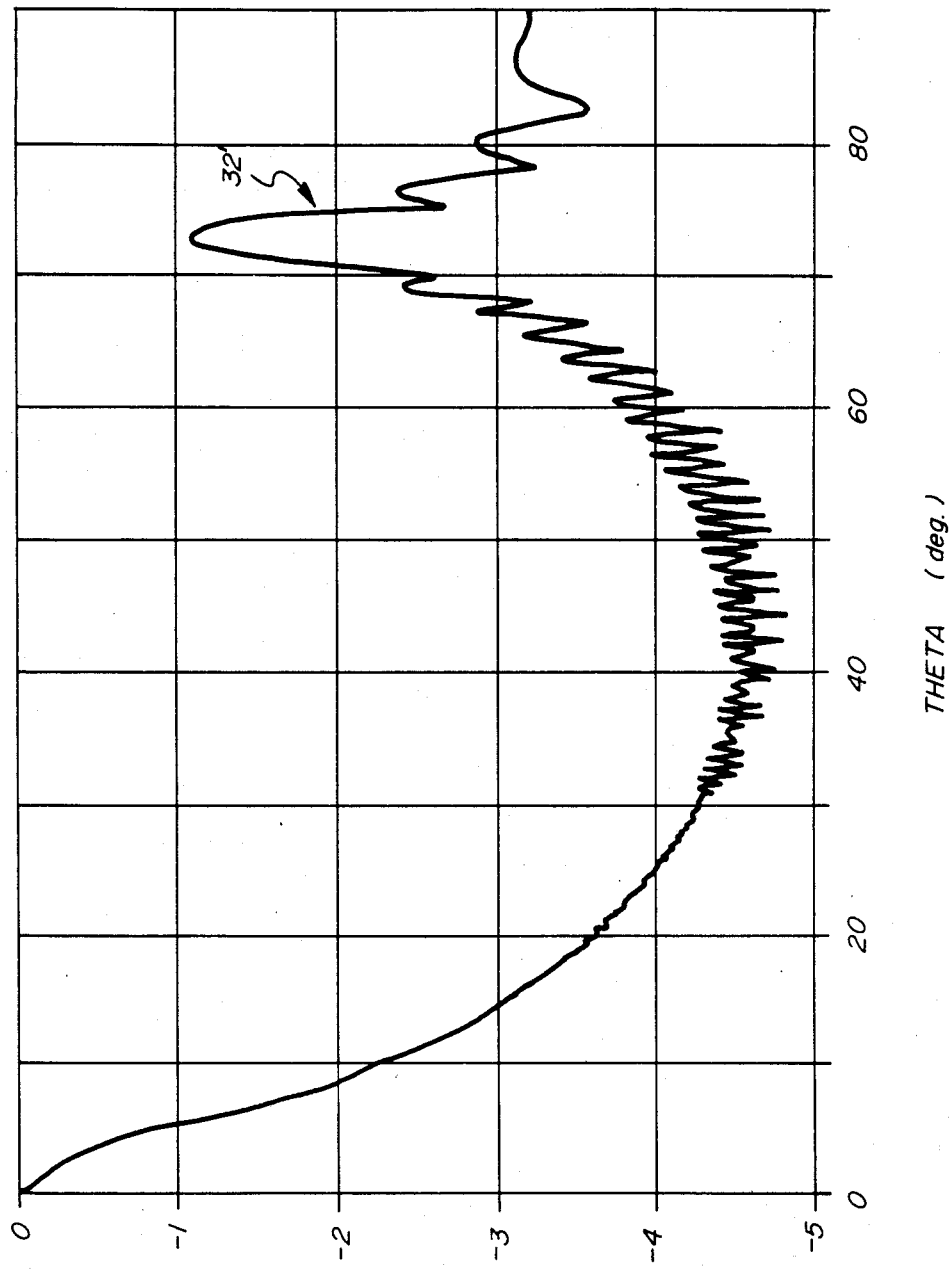

FIGS. 5A and 5B illustrate a modeled diffraction pattern 32 and 32' caused by the beam 22 impinging on a second example of the device 18. Unit $U_1$ has a d spacing $d_1$ of 60Å formed by a 8.4Å thick layer of molybdenum and a 51.6Å thick layer of carbon. Unit $U_2$ is a single layer unit with a d spacing $d_2$ of 60Å formed by a 60Å thick layer of silicon. (It should be noted that the d spacing $d_2$ is somewhat of a misnomer, since the d spacing is generally associated with at least two different layers.) In this example, $U_1$ has two layers and $U_2$ has the single layer, so only the wavelength $\lambda_1$ corresponding to $d_1$ and $\lambda_3$ corresponding to the d spacings $d_1+d_2$ of the layer set 20 will be reflected.

This device again was modeled for Li K α and C K α radiation. FIG. 5A illustrates the diffraction pattern 30 for the C K α radiation. The pattern is somewhat more complex than the first example, but again provides a peak reflection at a number of different angles. The five distinct peaks in this example can each be identified. The first peak corresponds to $d_2$ approximately at an angle of 12 degrees, the second peak corresponds to the first order of $d_1$ and the second order of $d_2$ approximately at an angle of 23 degrees, the third peak corresponds to the third order of $d_2$ approximately at an angle of 34 degrees, the fourth peak corresponds to the second order of $d_1$ and the fourth order of $d_2$ approximately at an angle of 48 degrees and the fifth peak corresponds to the fifth order of $d_2$ approximately at an angle of 69 degrees. FIG. 5B illustrates the diffraction pattern 32' for the Li K α radiation. Again, only a single major reflectivity peak corresponding to $d_2$ at an angle of approximately 73 degrees satisfies Bragg's law.

Also, the wavelengths of interest can be reflected at the same or different angles, as desired. To reflect the wavelengths $\lambda_1$ and $\lambda_2$ at the same angle $\theta$, the ratio of $\lambda_1/2d_1$ is equal to the ratio of $\lambda/2d_2$ to satisfy Bragg's law. The d spacings are changed and $\theta_1$ is not equal to $\theta_2$ for $\lambda_1$ to be reflected at $\theta_1$ and $\lambda_2$ to be reflected at $\theta_2$, again satisfying Bragg's law.

Figure 6:
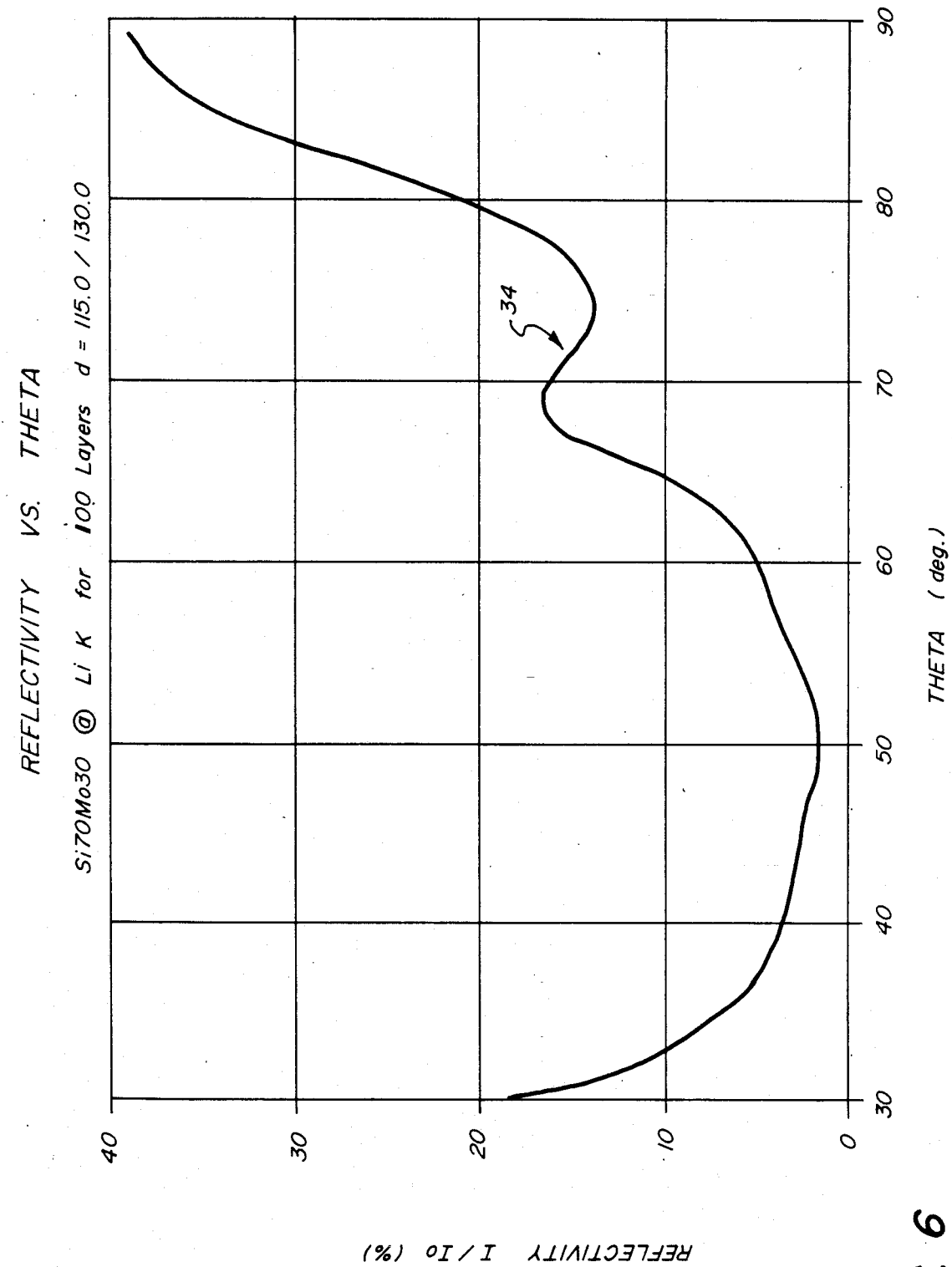
FIG. 6 is a model of a diffraction pattern generated by a third example of the device of FIG. 3.

FIG. 6 illustrates a modeled diffraction pattern 34 caused by the beam 22 impinging on a third special case example of the device 18. Unit $U_1$ has a d spacing $d_1$ of 115Å formed by a 49Å thick layer of molybdenum and a 66Å thick layer of silicon. Unit $U_2$ has a d spacing of 130Å formed by a 56Å thick layer of molybdenum and a 74Å thick layer of silicon. This device example can be utilized to monitor a plasma. The majority of the wavelength of interest, Li K α, is reflected back into the plasma essentially at an angle of 90 degrees. A minor portion of the wavelength is reflected at an angle of about 68 degrees, which then can be detected and monitored. The monitored portion of the wavelength by an appropriate shift in the d spacing can be utilized as a diagnostic for the time evolution of the intensity of the wavelength in the plasma, such as at or near laser frequencies of about 200-210Å.

Figure 7:
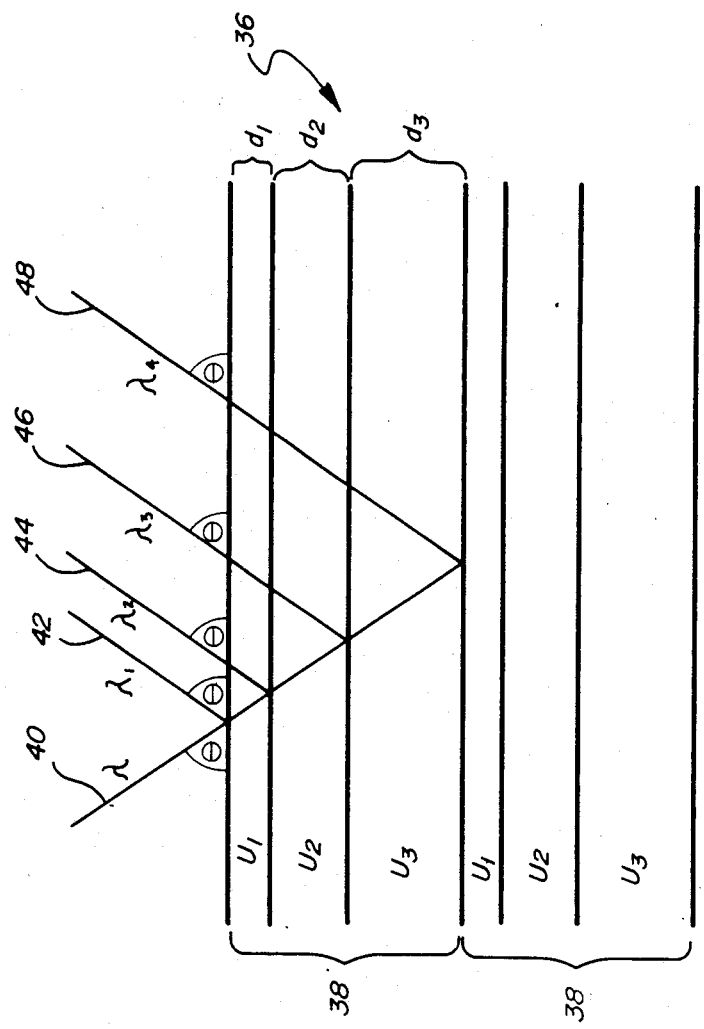
FIG. 7 is an exploded partial sectional view of a second embodiment of the X-ray dispersive device of the invention illustrating the X-ray dispersive pattern.
Figure 8A:
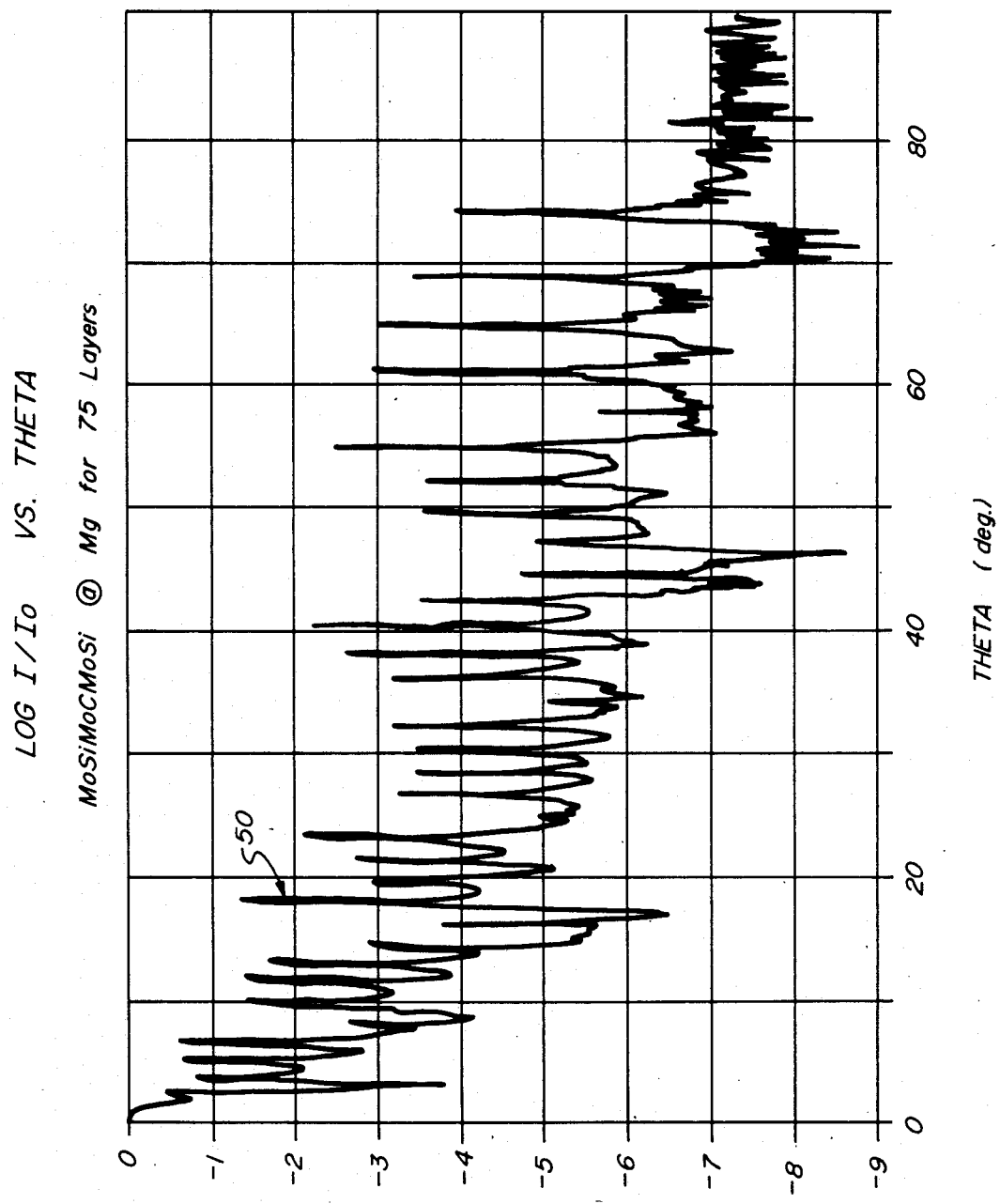
FIGS. 8A-8D are models of a diffraction pattern generated by one example of the device of FIG. 7.
Figure 8B:
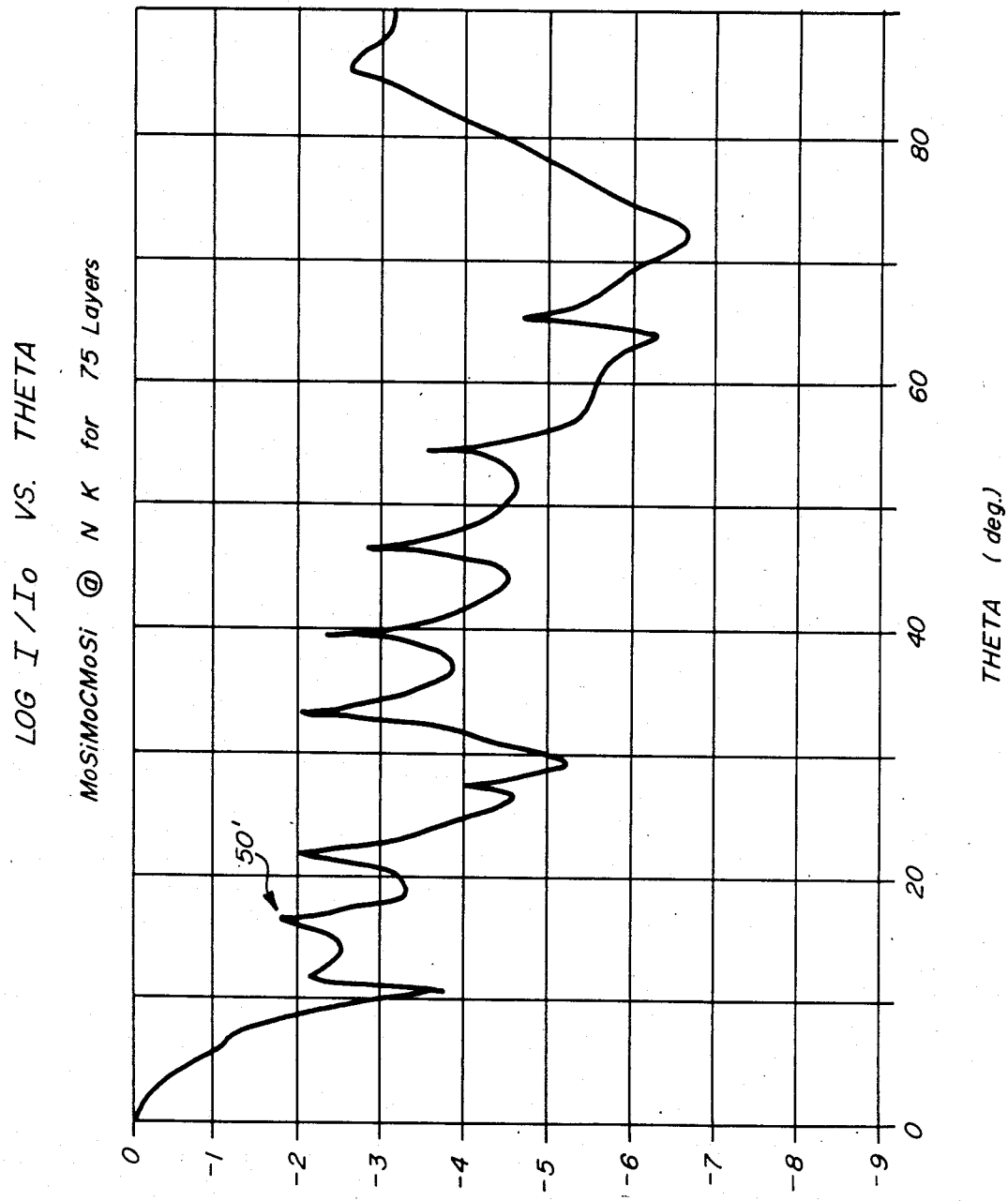
Figure 8C:
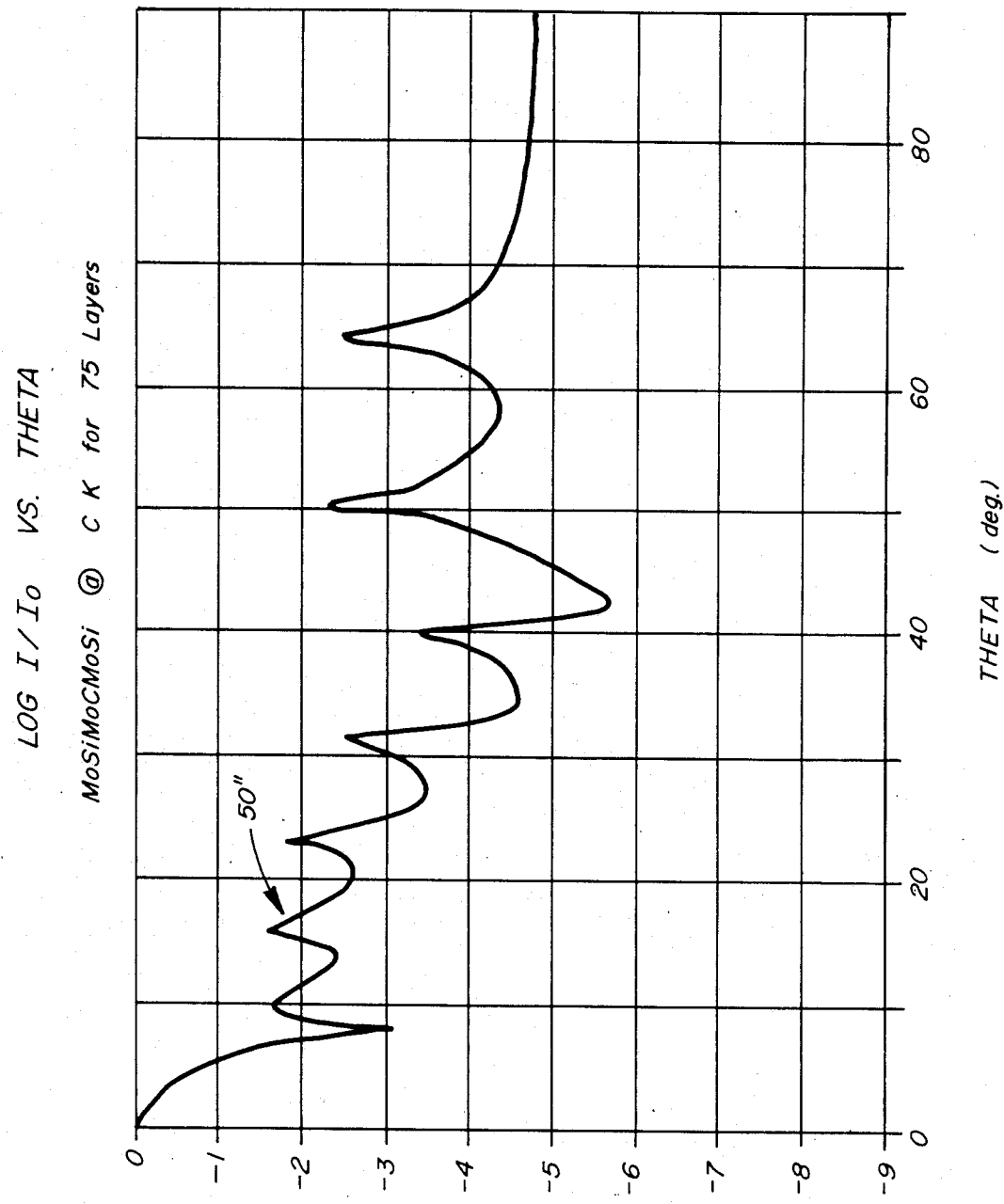
Figure 8D:
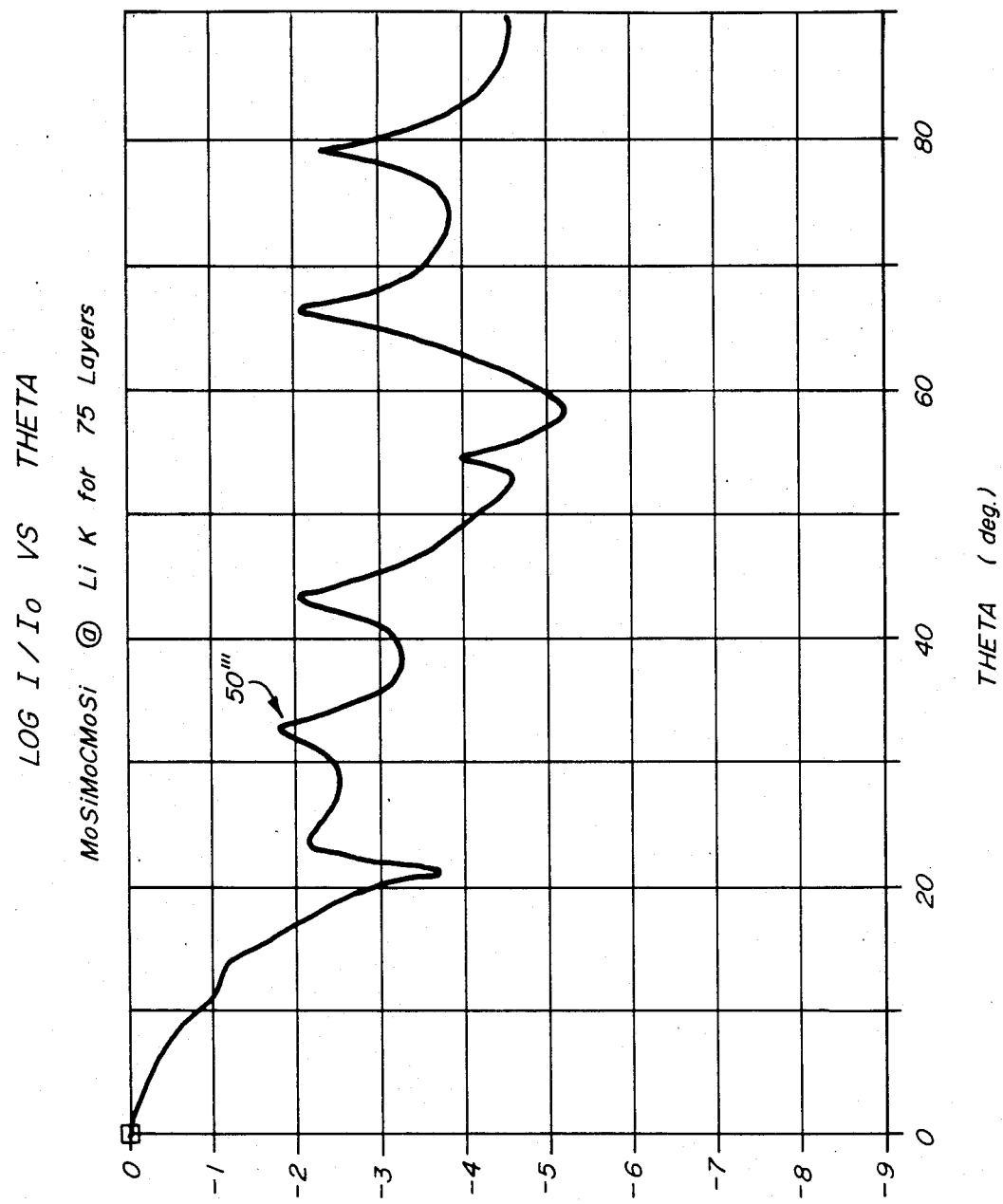

Another embodiment 36 of the invention is illustrated in FIG. 7 which includes three units $U_1$, $U_2$ and $U_3$ which form a plurality of layer sets 38. Again, for illustration purposes, only two layer sets 38 are shown. An incident X-ray beam 40 will be reflected as a ray 42 with a wavelength $\lambda_1$ contributed by $U_1$, a second ray 44 at a wavelength $\lambda_2$ contributed by $U_2$, a third ray 46 at a wavelength $\lambda_3$ contributed by $U_3$ and a fourth ray 48 at a wavelength $\lambda_4$ contributed by $U_1+U_2+U_3$. Again, if one of the units is designed to include only a single layer, then the corresponding reflected wavelength will not be reflected. Also, depending upon the design of the layer sets, there can be a fifth reflected ray at a wavelength contributed by $U_1+U_2$ and a sixth reflected ray at a wavelength contributed by $U_2+U_3$. The design criteria remains the same as for the units in the device 18.

FIGS. 8A-8D illustrate a modeled diffraction pattern 50, 50', 50" and 50''' caused by the beam 40 impinging on one example of the device 36. Unit $U_1$ has a d spacing $d_1$ of 25Å formed by a 5Å thick layer of molybdenum and a 20Å thick layer of silicon. Unit $U_2$ has a d spacing $d_2$ of 50Å formed by a 10Å thick layer of molybdenum and a 40Å thick layer of carbon. Unit $U_3$ has a d spacing $d_3$ of 100Å formed by a 20Å thick layer of molybdenum and an 80Å thick layer of silicon. The layer set 38 has a d spacing $(d_1+d_2+d_3)$ of 175Å.

This device example was modeled for four different wavelengths, Mg K α (9.98Å), N K α (31.6Å), C K α and Li K α and provides a fairly even magnitude of the peak reflectivities of each of the four wavelengths. At the shorter wavelengths, such as the Mg K α pattern 50, the influence of all of the periodicities are observed in the pattern. At the longer wavelengths the patterns are less complex, respectively shown by the patterns 50', 50" and 50''', where the peaks reflect the influence of only the longer d spacings. This structure reflects four wavelengths of interest which provides a composite pattern that facilitates the detection of one or more of the wavelengths by selecting the appropriate detection angle. For example, N K α and Li K α radiation both provide a peak at one angle of about 33 degrees. The N K α and C K α radiation both provide a peak at an angle of about 16 degrees and the Mg K α and C K α radiation both provide a peak at an angle of about 10 degrees. The Mg K α radiation alone provides a peak which can be detected at an angle of about 18 or 20 degrees.

Figure 9:
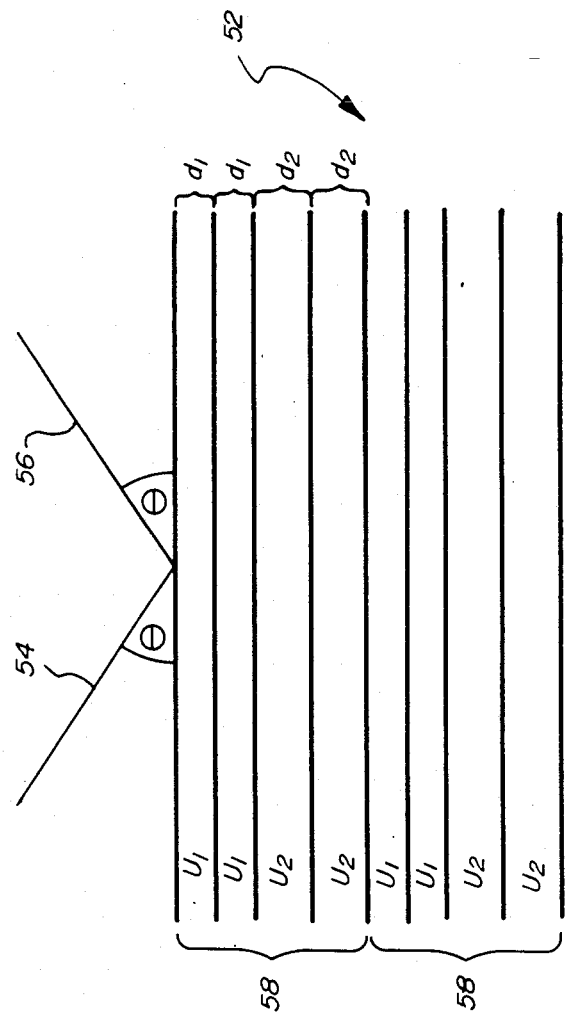
FIG. 9 is an exploded partial sectional view of a third embodiment of the X-ray dispersive device of the invention illustrating the X-ray dispersive pattern.

The devices 18 and 36 are similar in operation and contribute essentially equally to the reflected wavelengths of interest at the same or different angles. A device 52 is illustrated in FIG. 9, which can be designed as a sideband-type of device which provides an enhanced performance for one wavelength and lesser performance to other wavelengths or the same wavelength at different angles. The reflected wavelengths are more complex in this case and are not illustrated in FIG. 9. The device 52 reflects an X-ray beam 54 in a complex form 56 as described hereinafter. The device 52 has a plurality of layer sets 58, which each include two units $U_1$ of d spacing $d_1$ and two units $U_2$ of d spacing $d_2$. The major reflected performance at a particular angle will at least be for a wavelength corresponding to the d spacing of $U_1+U_2$ divided by two, i.e. $(d_1+d_2)/2$. The number of units $U_1$ and $U_2$ is chosen so that a selected long wavelength can be reflected at an angle near the angle of the reflected major performance, which will correspond to the d spacing of $d_1+d_1+d_2+d_2$. For this case, $d_1+d_2$ should have relatively the same thickness, on the order of less than twenty per cent in difference. A major sideband will correspond to the uppermost units, here $U_1$, and can be changed by inverting the order of the units.

Figure 10:
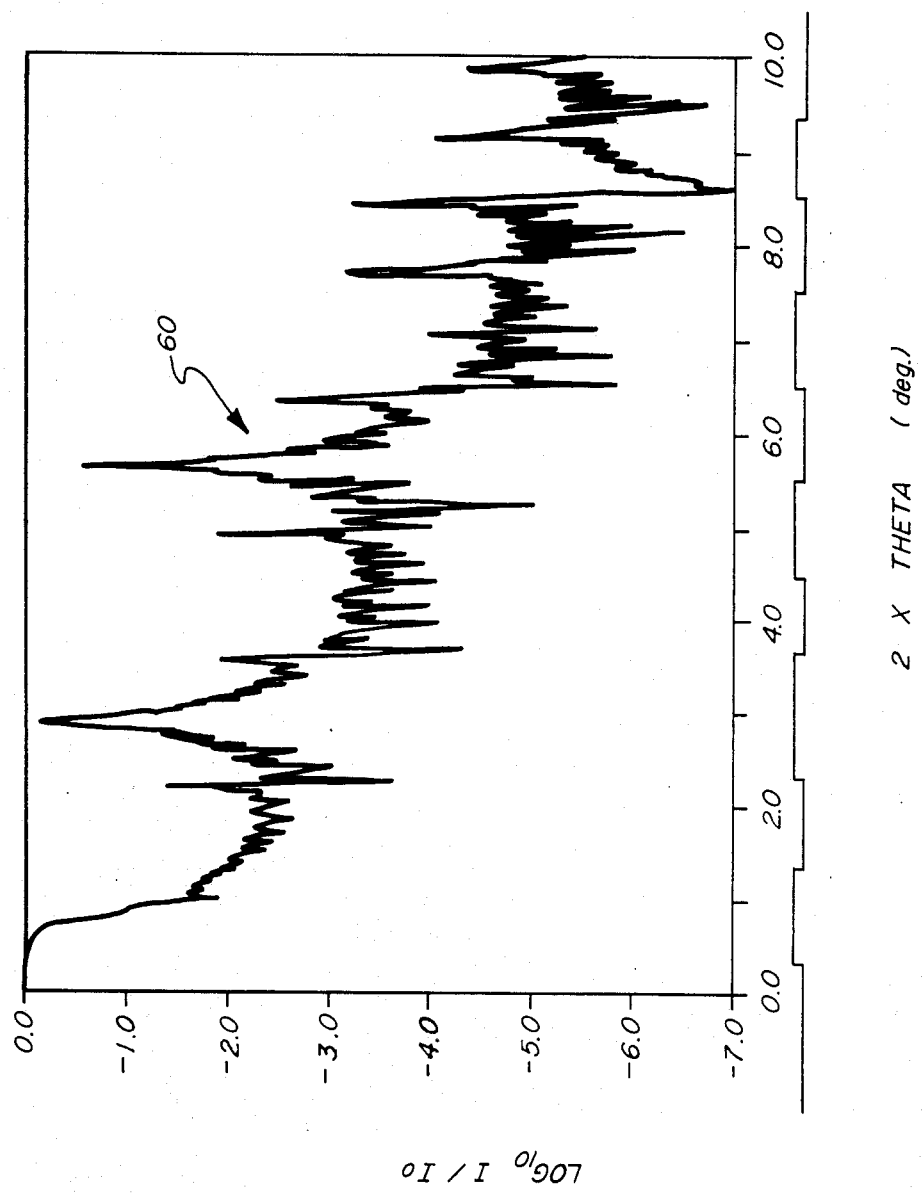
FIG. 10 is a model of a diffraction pattern generated by one example of the device of FIG. 9.

FIG. 10 illustrates a modeled diffraction pattern 60 caused by the beam 54 impinging on one example of the device 52. The device has two units $U_1$ having a d spacing $d_1$ of 30.6Å formed by a 10.2Å thick layer of tungsten and a 20.4Å thick layer of silicon. The device also has two units $U_2$ having a d spacing $d_2$ of 32.6Å formed by a 10.9Å thick layer of tungsten and a 21.7Å thick layer of silicon. The d spacing $(2d_1+2d_2)$ of the layer set 58 is 126.4Å.

This device was modeled for Cu K $\alpha$ (1.54Å) and has a major peak at an angle of about 1.5 degrees (A $2\theta$ of 3 degrees. The modeling was plotted for $2\theta$, since the experimental data in FIGS. 11 and 13 was taken and plotted in $2\theta$). The sidebands at angles of about 1.0 and 1.8 degrees are the major and minor sidebands respectively. The sidebands are only relative in intensity and the influence of the shorter d spacings of $d_1$ and $d_2$ can no longer be identified. The major peak corresponds to the fifth order of the average d spacing of 31.6Å and the fourth order of the d spacing of 126.4Å of the layer set. The major sideband corresponds to the third order of the layer set d spacing. In general this type of structure provides a peak performance at $n\lambda=L$ $(d_1+d_2)$ sin $\theta$, where L is the total member of units in the layer set and as above n will be equal to L and will be the order of the peak corresponding to the layer set d spacing. For example, four repeating units of $U_1$ and $U_2$ will result in $\lambda=(d_1+d_2)$ sin $\theta$ when n=8, which results in the eighth order corresponding to the major peak.

In general, in the prior devices 10, the peak performance decreases dramatically with the increasing orders of reflection. The above modeled device can be utilized to detect a short wavelength corresponding to the average d spacing and a long wavelength three times the modeled wavelength corresponding to the third order of the layer set d spacing (the first sideband) and/or a long wavelength corresponding to the fifth order of the layer set d spacing (the second sideband). For example, the 1.54Å wavelength can be monitored at the major peak and Cl K $\alpha$ radiation (4.7Å) can be monitored near the major sideband.

Figure 11:
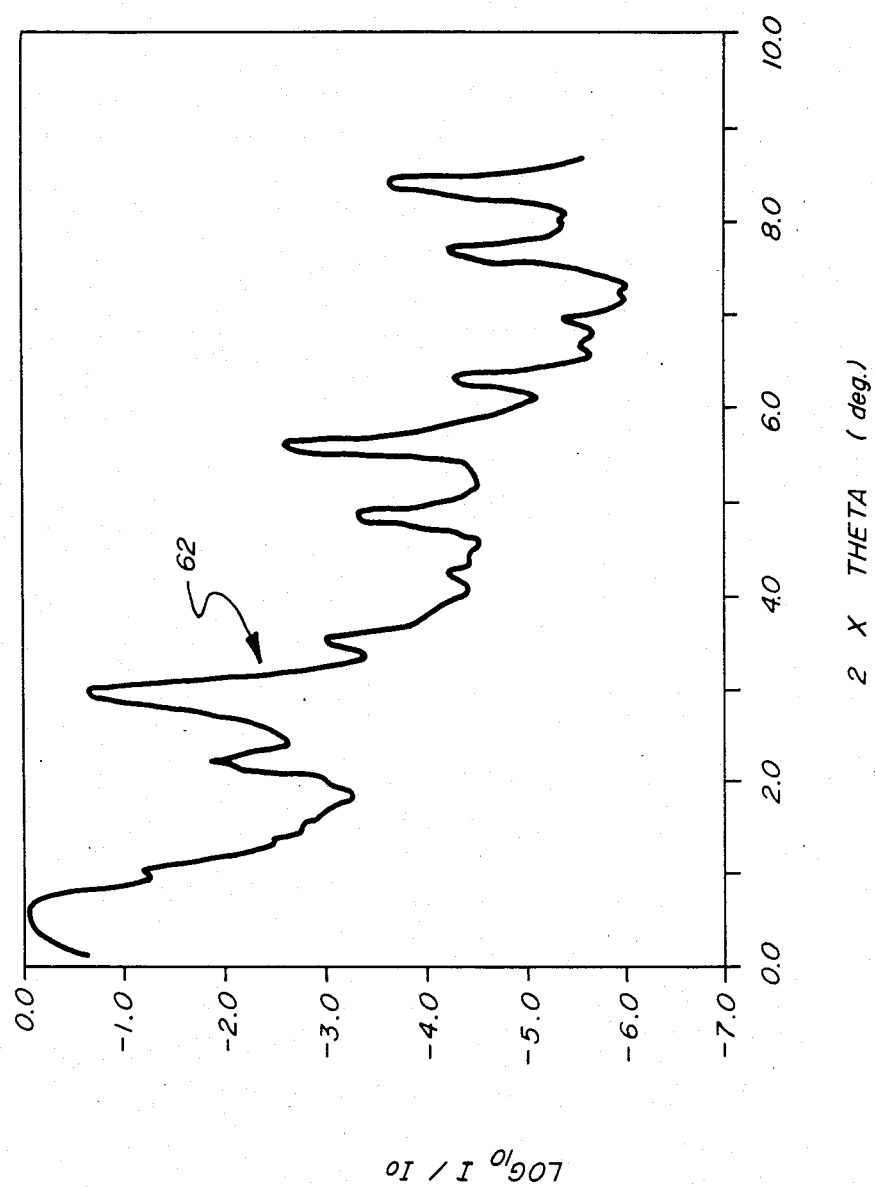
FIG. 11 is a diffraction pattern of the experimental data generated by the example of FIG. 10.

FIG. 11 illustrates a diffraction pattern 62 of the experimental data at Cu K $\alpha$ generated by the device example described with respect to FIG. 10. As is clearly illustrated, the first several orders of reflection are in very close agreement with the model pattern 60.

Although the device 52 is illustrated as having two units of each d spacing, the most simple case includes only one unit of either $U_1$ or $U_2$. In the case of one unit of $U_1$ and two units of $U_2$, then the major reflected performance will at least be for a wavelength approximately corresponding to the d spacing from the general formula of the total d spacing divided by the number of units, i.e. $(d_1+2d_2/3)$.

Figure 12:
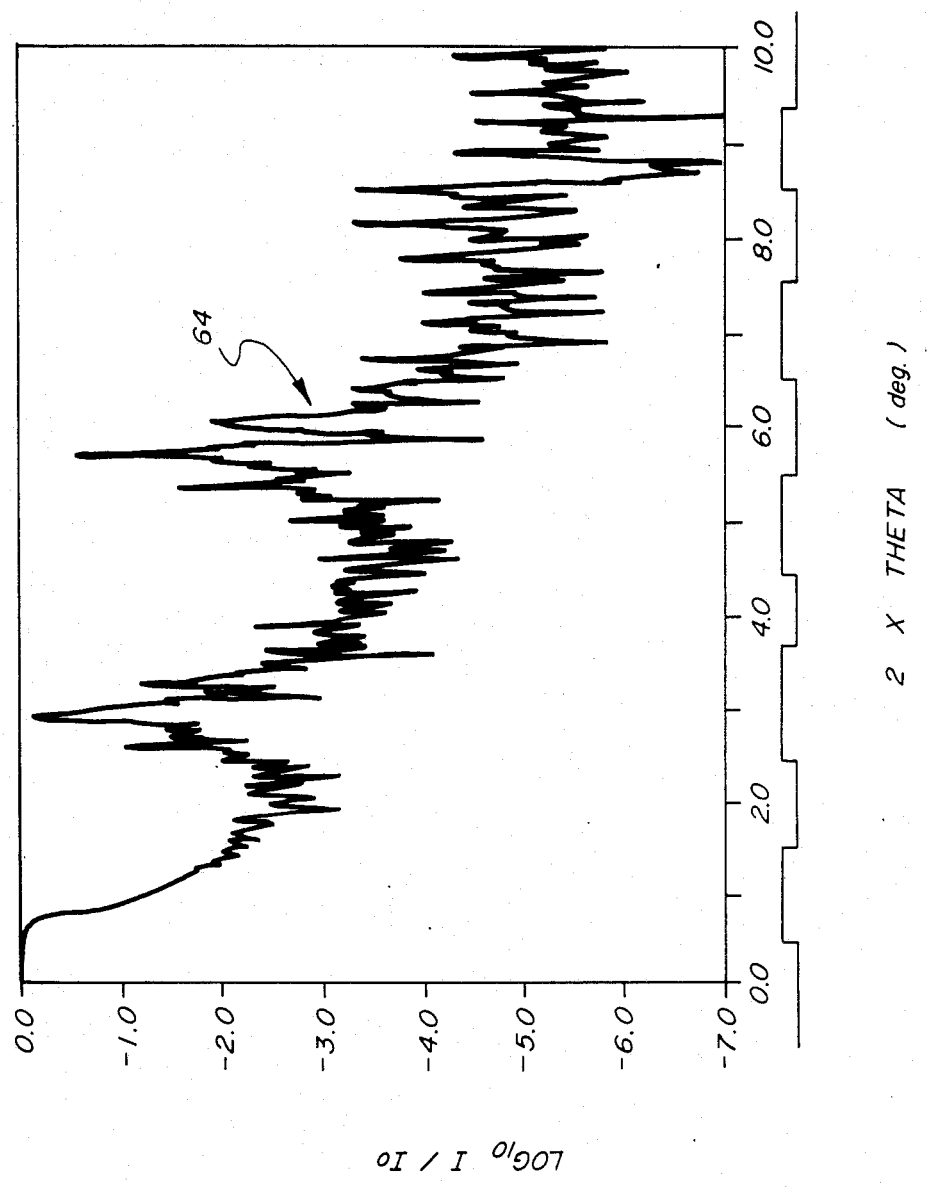
FIG. 12 is a model of a diffraction pattern generated by a second example of the device of FIG. 9.
Figure 13:
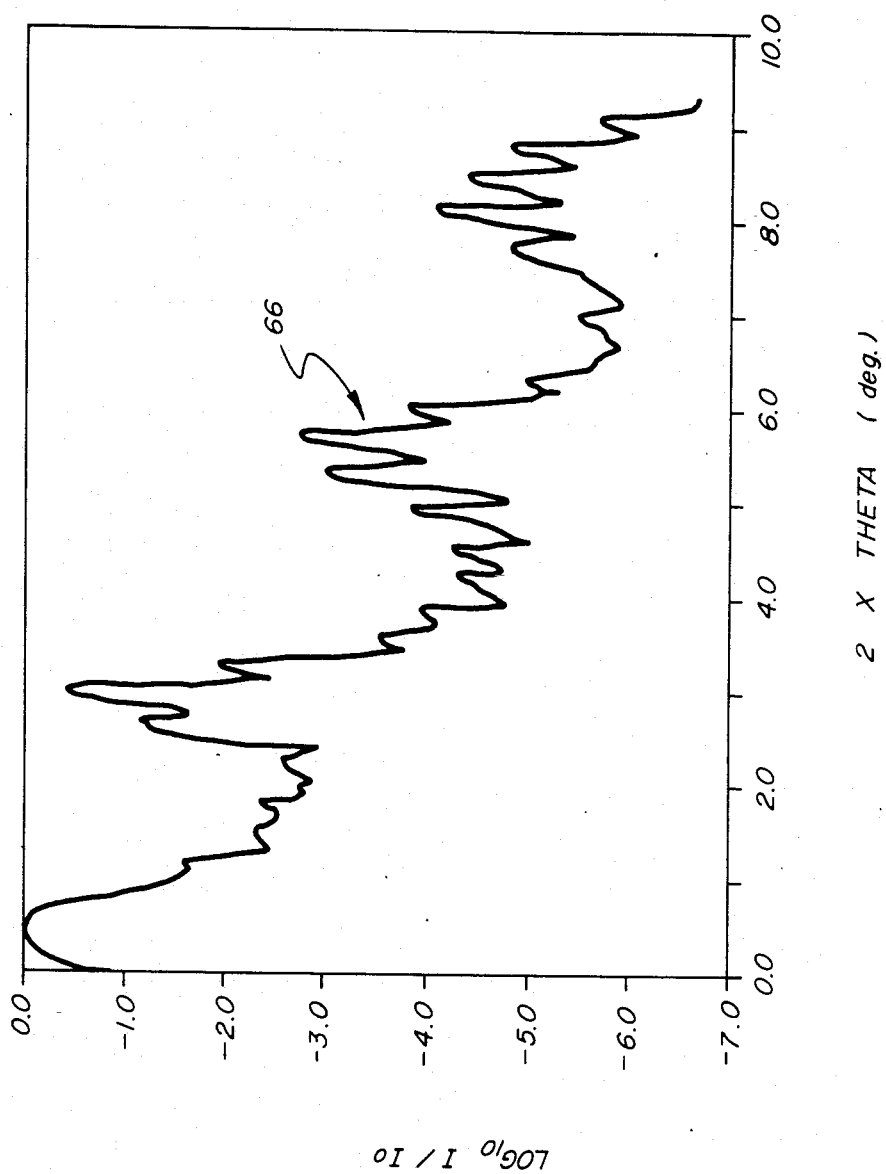
FIG. 13 is a diffraction pattern of the experimental data generated by the example of FIG. 12.

An increase in the number of units will move the sidebands closer to the primary wavelength reflection as illustrated in FIGS. 12 and 13. FIG. 12 illustrates a modeled diffraction pattern 64 at Cu K $\alpha$ caused by the beam 54 impinging on a second example of the device 52. The device is formed of the same units $U_1$ and $U_2$ described with respect to FIG. 10, except that the device has four units $U_1$ having a d spacing $d_1$ of 30.6Å and four units $U_2$ having a d spacing $d_2$ of 32.6Å. The d spacing $(4d_1+4d_2)$ of the layer set is 252.8Å. The sidebands are closer, but in other respects the discussion relative to FIG. 10 is also correct for this example.

FIG. 13 illustrates a diffraction pattern 66 of the experimental data at Cu K $\alpha$ generated by the device example described with respect to FIG. 12. Again, the first several orders of reflection are in close agreement with the pattern 64. Also the sidebands of the pattern 64/66 are closer to the major reflected peak than in the pattern 60/62.

Figure 14:
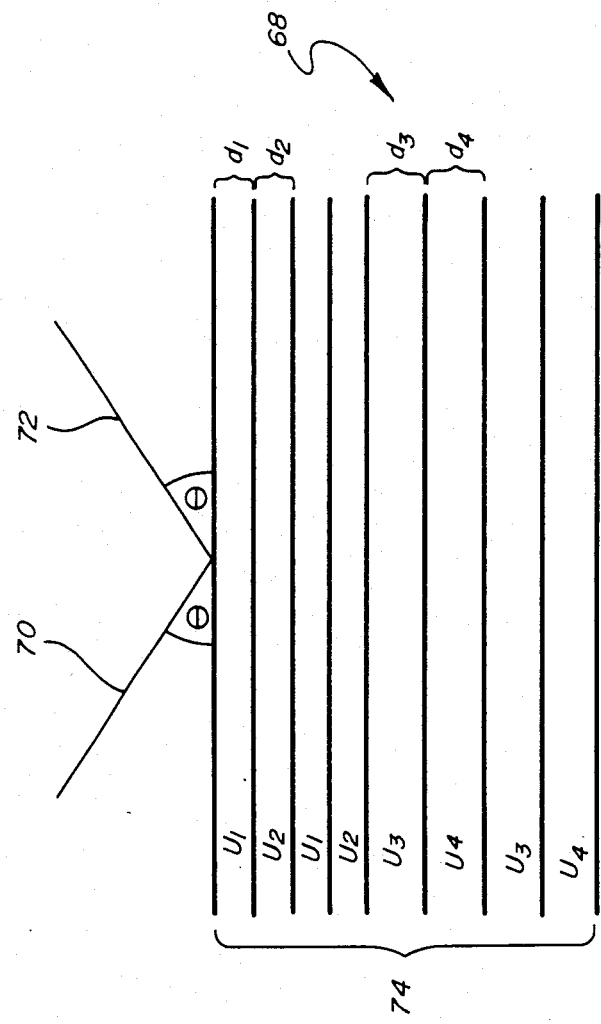
FIG. 14 is an exploded partial sectional view of a fourth embodiment of the X-ray dispersive device of the invention illustrating the X-ray dispersive pattern.

FIG. 14 illustrates a device 68 which is a combination of the devices 18 and 52. Again, a beam 70 causes a complex reflected wavelength 72 which is not shown for this device and only one layer set 74 is illustrated. The first unit of the device 68 is two units similar to two layer sets 20 of the device 18 and the second unit of the device 68 corresponds to two different units or layer sets of the device 18. The device 68 provides sidebands for the primary wavelengths of the two devices 18. The long wavelength will correspond to the sum of all the d spacings in the set 74.

Figure 15A:
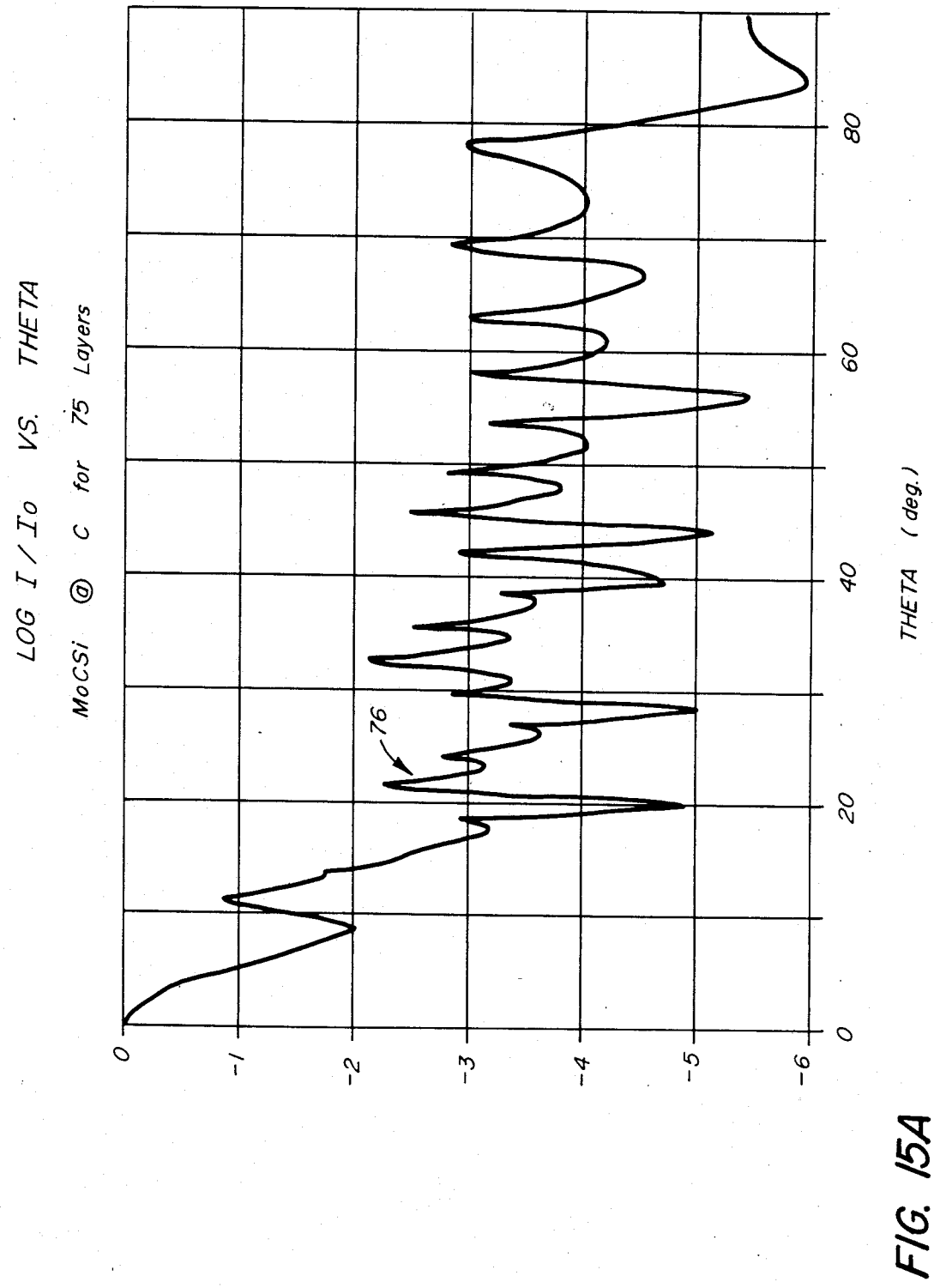
FIGS. 15A and 15B are models of a diffraction pattern generated by one example of the device of FIG. 14.
Figure 15B:
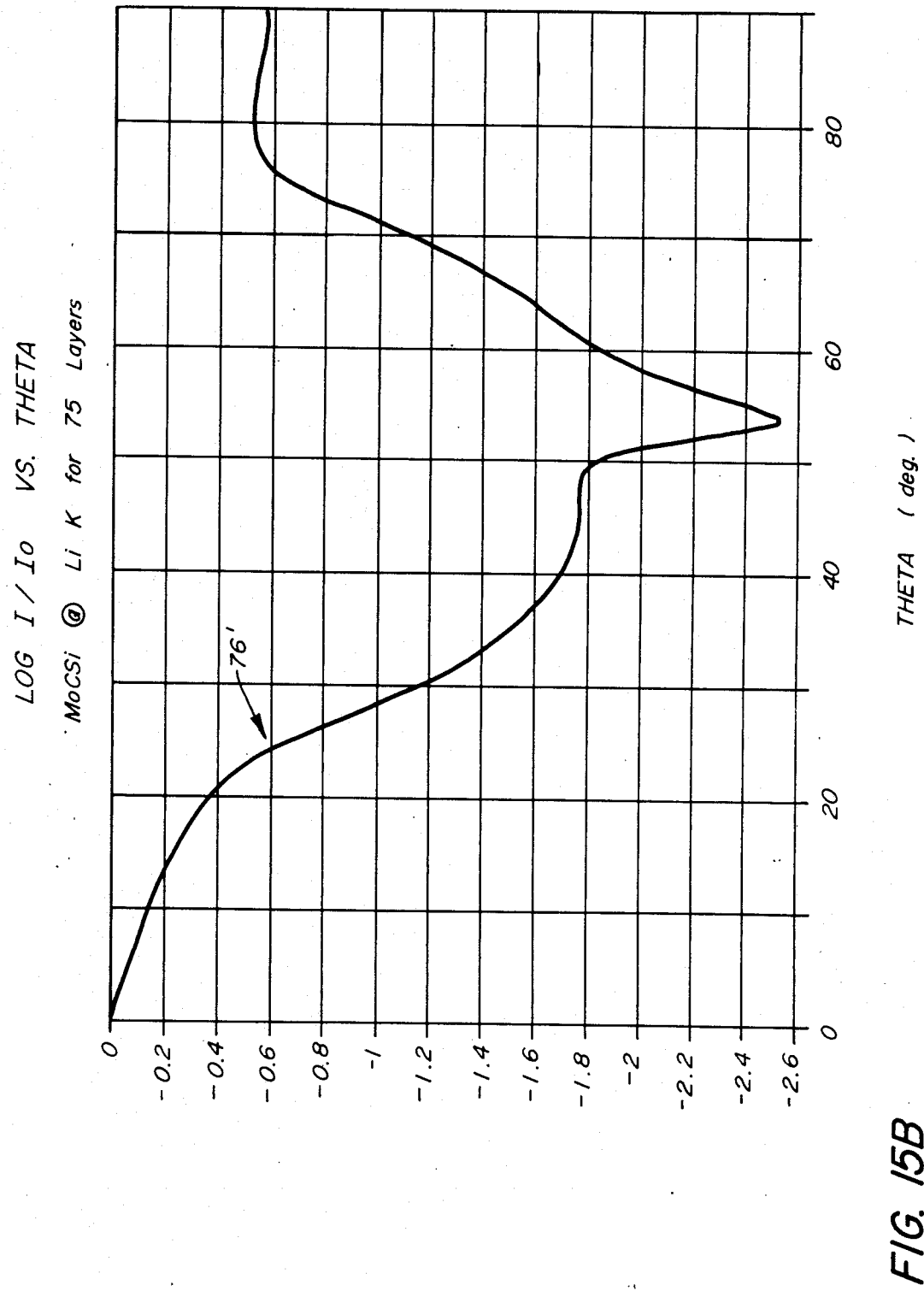

FIGS. 15A and 15B illustrate a modeled diffraction pattern 76 and 76' caused by the beam 70 impinging on one example of the device 68. Unit $U_1$ has a d spacing $d_1$ of 60Å and unit $U_2$ has a single layer with a d spacing of 60Å and $U_1$ and $U_2$ are formed the same as the units described with respect to FIGS. 5A and 5B. These two units $U_1$ and $U_2$ are repeated twice and are followed by two units $U_3$ and $U_4$ which also are repeated twice as shown in FIG. 14. Unit $U_3$ is the same as unit $U_1$ except it has a d spacing $d_3$ of 66Å. Unit $U_4$ is also the same as unit $U_2$ except that it has a d spacing $d_4$ of 66Å. The d spacing of the layer set 74 is 504Å.

The composite example of FIGS. 15A and 15B, adds sidebands to the example described with respect to FIGS. 5A and 5B and the resulting pattern can be compared to the patterns in FIGS. 5A and 5B. First, comparing the C K $\alpha$ pattern 32 to the pattern 76, the sidebands have been added to the peak reflections following the major reflections at an angle of about 12 degrees which is essentially the same in both patterns. The higher orders are suppressed over those in the pattern 32. The comparison of the pattern 32' to the pattern 76' shows a much more dramatic change. The pattern 76' shows an unusually high broad band performance for Li K $\alpha$. The major peak remains, but is shifted to an angle of about 80 degrees and broadened to extend to about 90 degrees. The major peak intensity has an intensity which is about three times greater than the previous peak (Note, the pattern 76' is on an expanded scale). Further, the integrated value for the reflected intensity pattern 76' is greatly increased over that for the pattern 32'.

In addition, it has been discovered that the peak reflectivity profile can be adjusted by a systematic or random minor variation in the d spacing of the units or the layer sets. The profile can be adjusted to substantially broaden the width of the peak and can be adjusted so that the peak will split into at least two peaks which are closely spaced apart. Such a structure can be utilized to increase the total collected energy by broadening the reflected peak of interest and to generate adjacent wavelengths which both can be detected by splitting the peak. This adjustment can be accomplished with the single unit $U_1$ prior art structure 10 or with the structures discussed with respect to FIGS. 3, 7, 9 and 14 to adjust one or more of the peaks of interest.

It has been previously assumed that variations in the interface or boundary between layers was a key element in determining reflectivity performance of the prior art device 10. This has led to efforts to minimize such variations. A theory has been set forth which describes the reduction in reflectivity from the formula:

$$\frac{I}{I_o} = \frac{I \exp}{I_o \text{ ideal}} [-(2\pi n \Delta z)^2]$$

where n is the order of reflection, d the layer spacing and $\Delta z$ is a roughness factor representing the average deviation from a flat surface. The theory is independent of the d ratio of the materials and of the materials themselves. Calculating according to the above theoretical formula for a d spacing of 40.6Å for a roughness parameter of 2Å results in a decrease in first order peak reflectivity of about 25 per cent, a decrease in second order reflectivity of about 45 per cent and a decrease in third order reflectivity of about 60 per cent.

In dramatic contrast, by modeling according to the model and by direct experiment it has been discovered that the interfacial roughness is of much less importance at least for the first three orders of reflectivity. An example, of the prior device 10 was modeled for a d spacing of 40.6Å, a d spacing ratio of Si:W of 1.28 and for a 2Å random variation in the d spacing. The first order reflectivity remains about constant, the second order reflectivity increases about 5 per cent and the third order reflectivity decreases about 17 per cent. This increase in the second order reflectivity would at first not seem logical, but in fact follows from the change from the exact step or square wave density distibution. This enhancement can be associated with the shift in lower order Fourier components of the electron density distribution.

Modification and variations of the present invention are possible in light of the above teachings. The term X-ray is utilized to mean wavelengths of 500Å or below, which are consistent with Bragg's law and the d spacings utilized. It is therefore to be understood that within the scope of the appended claims, the invention may be practiced otherwise than as specifically described.

What is claimed and desired to be secured by Letters Patent of the United States is:

1. A multiple wavelength x-ray diffraction device comprising:
    a plurality of layer sets formed on one another, each of said layer sets including at least a first unit, $U_1$, and a second interleaved unit, $U_2$;
    said first unit $U_1$ including at least two layers, said first unit having a first interplanar spacing, $d_1$, causing said layer sets to have x-ray diffraction properties at a first wavelength of interest $\lambda_1$;
    said second unit, $U_2$ including at least two layers, said second unit having a second interplanar spacing $d_2$, different from $d_1$ causing said layer sets to have x-ray diffraction properties at a second wavelength of interest(.) $\lambda_2$ different from $d_1$, and;
    said layer sets including a first unit, $U_1$, and a second unit, $U_2$, to form a structure of alternating $U_1$ and $U_2$ units and having an interplanar spacing $(d_1+d_2)$.

2. The device as defined in claim 1 wherein each of said first and second units is formed at least from alternating layers of two materials, said two materials being the same for each of said first and second units.

3. The device as defined in claim 1 wherein each of said first and second units are formed at least from alternating layers of two materials, said two materials being different for said first and said second units.

4. The device as defined in claim 1 wherein each of said layer sets includes more than one of said first or said second units.

5. The device as defined in claim 4 wherein each of said layer sets includes more than one of said first and said second units.

6. The device as defined in claim 1 wherein each of said layer sets includes at least a third unit, said third unit including at least two layers, said third unit having a third interplanar spacing, $d_3$, causing said layer sets to have x-ray diffraction properties at a third wavelength of interest $\lambda_3$.

7. The device as defined in claim 1 wherein said layer sets are designed such that said first and second wavelengths, $\lambda_1$, and $\lambda_2$, of interest are diffracted at the same angle.

8. The device as defined in claim 1 wherein said layer sets are designed such that said first and second wavelengths of interest, $\lambda_1$ and $\lambda_2$ are at different angles.

9. A method of forming a multiple wavelength x-ray diffraction device, comprising:
    forming a plurality of layer sets on one another, each of said layer sets including at least a first unit $U_1$, and a second unit $U_2$;
    forming said first unit $U_1$ including at least two layers having a first interplanar spacing $d_1$ causing said layer sets to have x-ray diffraction properties at a first wavelength of interest $\lambda_1$; and $\lambda$
    forming said second unit including at least two layers having a second interplanar spacing, $d_2$ different from $d_1$, causing said layer sets to have x-ray diffraction properties substantially at a second wavelength of interest different from $\lambda_1$.

10. The method as defined in claim 9 including forming said first unit $U_1$ and second Units $U_2$ from at least alternating layers of two materials, said two materials being the same for each of said first and second units.

11. The method as defined in claim 9 including forming each of said first and second units from at least alternative layers of two materials, said two materials being different for said first and said second units.

12. The method as defined in claim 9 including forming each of said layer sets with more than one of said first or said second units.

13. The method as defined in claim 12 including forming each of said layer sets from more than one of said first and said second units.

14. The method as defined in claim 9 including forming each of said layer sets with at least a third unit $U_3$ including at least two layers and forming said third unit with a third interplanar spacing $d_3$ different from $d_1$ and $d_2$ causing said layer sets to have x-ray diffraction properties at a third wavelength of interest $\lambda_3$.

15. The method as defined in claim 9 including forming said layer sets such that said first and second wavelengths of interest are diffracted at the same angle.

16. The method as defined in claim 9 including forming said layer sets such that said first and second wavelengths of interest are diffracted at different angles.

* * * * *